US012667821B2

(12) United States Patent (10) Patent No.: US 12,667,821 B2
Campayo et al. (45) Date of Patent: Jun. 30, 2026

(54) PARTICULATE POROUS INORGANIC MATERIAL BASED ON A LEAD VANADATE OR PHOSPHOVANADATE, USEFUL FOR CAPTURING AND CONDITIONING GASEOUS IODINE

(71) Applicant: COMMISSARIAT À L'ÉNERGIE ATOMIQUE ET AUX ÉNERGIES ALTERNATIVES, Paris (FR)

(72) Inventors: Lionel Campayo, Bagnols-sur-Ceze (FR); Raphaël Penelope, Villeneuve-la-Garenne (FR)

(73) Assignee: COMMISSARIAT À L'ÉNERGIE ATOMIQUE ET AUX ÉNERGIES ALTERNATIVES, Paris (FR)

( * ) Notice: Subject to any disclaimer, the term of this patent is extended or adjusted under 35 U.S.C. 154(b) by 679 days.

(21) Appl. No.: 18/066,688

(22) Filed: Dec. 15, 2022

(65) Prior Publication Data

US 2023/0302428 A1 Sep. 28, 2023

(30) Foreign Application Priority Data

Dec. 23, 2021 (FR) ...................................... 2114366

(51) Int. Cl.
| | |
|---|---|
| *C01G 31/00* | (2006.01) |
| *B01D 53/02* | (2006.01) |
| *B01J 20/06* | (2006.01) |
| *B01J 20/28* | (2006.01) |
| *B01J 20/30* | (2006.01) |
| *B01J 20/32* | (2006.01) |
| *G21F 9/02* | (2006.01) |

(52) U.S. Cl.
CPC .............. *B01J 20/06* (2013.01); *B01D 53/02* (2013.01); *B01J 20/28004* (2013.01); *B01J 20/28016* (2013.01); *B01J 20/3007* (2013.01); *B01J 20/3078* (2013.01); *B01J 20/3204* (2013.01); *B01J 20/3221* (2013.01); *B01J 20/3295* (2013.01); *C01G 31/006* (2013.01); *G21F 9/02* (2013.01); *B01D 2253/1124* (2013.01); *B01D 2257/202* (2013.01); *C01P 2004/60* (2013.01)

(58) Field of Classification Search
None
See application file for complete search history.

(56) References Cited

U.S. PATENT DOCUMENTS

2010/0276634 A1* 11/2010 Campayo .............. C04B 35/495
252/182.33

FOREIGN PATENT DOCUMENTS

| WO | 9618196 A | 6/1996 |
|---|---|---|
| WO | 2009047246 A1 | 4/2009 |

OTHER PUBLICATIONS

Robin et al. Influence of vanadium substitution on sintering behavior of Pb3(VO4)2(10x)PO4)2x ceramics. Journal of the European Ceramic Society 20, 1231-1240 (2000). (Year: 2000).*
Yousefi, Ramin et al., "Effect of hydrogen gas on the growth process of PbS nanorods grown by a CVD method" Current Applied Physics 2014, 14(8), pp. 1031-1035.
Campayo, L. "Spark plasma sintering of lead phosphovanadate Pb"3(V04)"1.6(P04)0.4" Journal of the European Ceramic Society 2009, 29, pp. 1477-1484.
Yao, Tiankai et al., "Bulk Iodoapatite Ceramic Densified by Spark Plasma Sintering with Exceptional Thermal Stability" Journal of the American Ceramic Society 2014, 97(8), pp. 2409-2412.
Suetsuga, Yasushi, "Synthesis of lead vanadate iodoapatite utilizing dry mechanochemical process" Journal of Nuclear Materials 2014, 454, pp. 223-229.
Search Report for French application No. 2114366 dated Aug. 8, 2022.

* cited by examiner

*Primary Examiner* — Sheng H Davis
(74) *Attorney, Agent, or Firm* — Chrisman Gallo Tochtrop LLC

(57) ABSTRACT

An inorganic material in a form of open-porosity particles, each of the particles comprising a lead vanadate or phosphovanadate of formula $Pb_{3-x}X_x(VO_4)_{2-2y}(PO_4)_{2y}$, wherein $x=0$ or $x>0$ but $\leq 0.33$; $y=0$ or $y>0$ but $<1$; $X=Ba^{2+}$, $Ca^{2+}$, $Sr^{2+}$ or $Cd^{2+}$; and metallic lead or a lead salt. A method for preparing the material, a method for capturing iodine present in a gaseous effluent as well as a method for conditioning iodine present in a gaseous effluent in a form of an iodoapatite.

17 Claims, 2 Drawing Sheets

PARTICULATE POROUS INORGANIC MATERIAL BASED ON A LEAD VANADATE OR PHOSPHOVANADATE, USEFUL FOR CAPTURING AND CONDITIONING GASEOUS IODINE

CROSS-REFERENCE TO RELATED APPLICATIONS

This application claims priority from French Patent Application No. 2114366 filed on Dec. 23, 2021. The content of this application is incorporated herein by reference in its entirety.

TECHNICAL FIELD

The invention relates to the technical field of treating gaseous effluents comprising iodine and in particular radioactive iodine.

More specifically, it relates to an inorganic material in the form of porous particles, which is provided with great capacity for chemisorbing (i.e. irreversibly adsorbing) iodine in the gaseous state when it is put in contact with this iodine and which, once loaded with iodine, can be transformed, by heat treatment, into a ceramic in the apatite family wherein the iodine is confined.

It also relates to a method for preparing this material as well as to uses thereof, in particular for conditioning the iodine present in a gaseous effluent.

The invention finds in particular an application in the field of processing spent nuclear fuels, where it is able to be used for conditioning and storing in a matrix the radioactive iodine present in the gaseous effluents produced in the course of this processing, and in particular iodine-129, for example in the case where managing this iodine by isotope dilution in marine iodine is not possible.

PRIOR ART

Iodine-129 is a moderate-activity fission product with a long life (half-life of 15.7 million years) that is generated during fission reactions of uranium and plutonium in nuclear power stations and is therefore present in spent nuclear fuels.

In France, management of iodine-129 is mainly based on an isotope dilution in marine iodine, i.e. by discharging in the sea.

In the context of developing factories for processing spent nuclear fuels without the possibility of maritime access or a change in the regulations that would prohibit management of iodine-129 by discharge at sea, research is being carried out on alternative methods for managing iodine-129 and in particular on conditioning thereof in a durable matrix, notably because it is provided with resistance to dissemination by vectors such as water, with a view to dispose thereof in a deep geological stratum. This research lies in particular within the French project of the centre for deep disposal of radioactive waste of CIGÉO conducted by the Agence nationale pour la gestion des déchets radioactifs (or ANDRA).

Trapping, or capturing, the iodine present in a gaseous effluent by means of solid adsorbents, or filters, which are generally based on alumina, silica or aluminosilicates and which are typically impregnated with silver nitrate, is known. Iodine in molecular form, or diiodine $I_2$, reacts with the silver nitrate to form silver iodide, AgI, and is held in this form in the solid adsorbent. Adsorbents of this type are currently used for capturing the iodine present in the gaseous effluents produced by factories processing spent nuclear fuels.

However, these adsorbents, which by nature have large exchange surface areas, are unsuited to conditioning the iodine with a view to deep geological disposal.

Conditioning the iodine in ceramics of the apatite family, which represents a mineralogical family with excellent chemical and physical durability performances, is also known, in particular through WO-A-96/18196—hereinafter reference [1]—and through WO-A-2009/047246—hereinafter reference [2]. To implement this type of conditioning, the iodine is mixed, in the form of a solid iodated compound such as lead iodide, $PbI_2$, or silver iodide, AgI, with a lead vanadate or phosphovanadate, and then the mixture is subjected to reactive sintering, for example by the flash sintering technique, to lead to a dense ceramic, called iodoapatite.

Such iodoapatite cannot be produced directly from a solid adsorbent loaded with iodine. This is because producing an iodoapatite from such an adsorbent requires extracting the iodine from this adsorbent and converting it into a solid chemical form compatible with integration thereof in the apatite structure.

The inventors therefore decided to rethink the nature of the solid adsorbents dedicated to capturing gaseous iodine so that these adsorbents can, once loaded with iodine, be directly consolidated in high-durability conditioning matrices.

They also wished for these adsorbents to be able to be prepared by a method that is simple to implement and for consolidation thereof in conditioning matrices to be able to be done at a temperature that minimises the risks of volatilisation of the iodine, i.e. typically a temperature of no more than 650° C.

DESCRIPTION OF THE INVENTION

The invention aims precisely to propose an inorganic material which is capable of very effectively chemisorbing iodine in gaseous form and which, once loaded with iodine, can be directly consolidated in an iodoapatite by heat treatment.

This material is in the form of open-porosity particles, where each of the particles comprises:

a lead vanadate or phosphovanadate of the following formula (1):

$$Pb_{3-x}X_x(VO_4)_{2-2y}(PO_4)_{2y} \qquad (1)$$

wherein:

x is equal to 0 or x is greater than 0 but no more than 0.33;

y is equal to 0 or y is greater than 0 but less than 1;

X is a divalent cation selected from $Ba^{2+}$, $Ca^{2+}$, $Sr^{2+}$ and $Cd^{2+}$; and 2) metallic lead or a lead salt, this lead or lead salt serving as an agent for capturing gaseous iodine.

In the above and hereinafter:

inorganic material means a material that comprises neither carbon nor hydrogen;

open porosity means a porosity consisting of pores that not only emerge on the surface of the particles—and which therefore communicate with the exterior of these particles—but also communicate with other pores, themselves communicating or not with the exterior of the particles; and metallic lead means lead in the 0 oxidation state, denoted Pb⁰.

In accordance with the invention, the agent capturing gaseous iodine may, firstly, be intimately mixed with the lead vanadate or phosphovanadate, in which case this agent may be either metallic lead or a lead salt of the lead(II) sulfide, lead(II) sulfate, lead(II) carbonate, lead(II) bromide, lead(II) chloride, lead(II) fluoride, lead(II) hydroxide, lead (II) selenide, or lead(II) telluride type, preference being given to lead(II) sulfide.

In a variant, the agent capturing gaseous iodine can be present in pores of the particles, in which case this agent can in particular be a lead salt of the lead(II) nitrate, lead(II) chlorate or lead(II) perchlorate trihydrate type, preference being given to lead(II) nitrate.

In accordance with the invention, the lead vanadate or phosphovanadate preferably complies with the following formula (2):

$$Pb_3(VO_4)_{2-2y}(PO_4)_{2y} \qquad (2)$$

in which y is equal to 0 or y is greater than 0 but less than 1.

When y is equal to 0, then the particles comprise a lead vanadate of formula $Pb_3(VO_4)_2$.

When y is greater than 0 but less than 1, then y is preferably between 0.1 and 0.75 and better still between 0.1 and 0.3.

Thus, for example, the particles may comprise a lead phosphovanadate of formula $Pb_3(VO_4)_{1.6}(PO_4)_{0.4}$.

Preferably, the particles have dimensions between 300 μm and 3 mm as determined for example by laser granulometry.

The material of the invention can in particular be prepared by a method that comprises at least the steps of:

preparing a mixture M comprising at least one precursor of formula (3) or of formula (4) below:

$$Pb_{2-x}X_xV_{2-2y}P_{2y}O_7 \qquad (3)$$
$$Pb_{3-x}X_x(VO_4)_{2-2y}(PO_4)_{2y} \qquad (4)$$

in which:

x is equal to 0 or x is greater than 0 but no more than 0.33;

y is equal to 0 or y is greater than 0 but less than 1;

X is a divalent cation selected from $Ba^{2+}$, $Ca^{2+}$, $Sr^{2+}$ and $Cd^{2+}$; and an alginate of an alkaline metal in water;

b) extruding in a divided form the mixture M in an aqueous solution A comprising a lead salt and optionally a barium salt, a calcium salt, a strontium salt or a cadmium salt, by means of which beads formed by a hydrogel are obtained;

c) drying the beads; and d) calcining the beads, by means of which open-porosity particles are obtained;

and which also comprises:

either an addition of metallic lead or of a lead salt that is insoluble or only slightly soluble in water to the precursor of formula (3) or (4) and to the alkaline metal alginate in the mixture M;

or a deposition of a lead salt in the pores of the particles obtained at step d).

Lead salt that is insoluble or only slightly soluble in water means a lead salt that has a solubility in water of no more than 10 g/L at 20° C. and at a pressure of one atmosphere.

In accordance with the invention, the precursor of formula (3) or (4) preferably represents from 2.5% to 5% by mass and better still 3% by mass of the mixture M while the alkaline metal alginate preferably represents from 0.5% to 3% by mass and better still 2% by mass of the mixture M, all these percentages being with reference to the mass of the mixture M (the difference to 100% consisting of water).

If a lead salt that is insoluble or only slightly soluble in water, such as lead(II) sulfide, lead(II) sulfate, lead(II) carbonate, lead(II) bromide, lead(II) chloride, lead(II) fluoride, lead(II) hydroxide, lead(II) selenide or lead(II) telluride, is added in the mixture M, then this salt preferably represents from 0.2% to 0.5% by mass and better still 0.3% by mass of this mixture.

The alkaline metal alginate is advantageously a sodium or potassium alginate, preference being given to a sodium alginate.

This sodium alginate is for example the alginate having the CAS number 9005-38-3 and which is available from the company Sigma-Aldrich under the name "Alginic acid sodium salt".

At step b), the composition of the aqueous solution A used for the extrusion is selected according to the precursor used and the composition that it is wished to confer on the particles of the material of the invention, and thereby the iodoapatite that will be obtained after this material is consolidated.

Thus, if the precursor of formula (3) or (4) is free from any cation X (i.e. x=0 in this formula) and if it is wished for the particles to comprise a lead vanadate or phosphovanadate of formula (1) in which a cation X is present (i.e. x>0), then the aqueous solution A comprises, as salts, both a lead salt, for example lead(II) nitrate, and a barium salt, a calcium salt, a strontium salt or a cadmium salt, for example a nitrate.

In the other cases, then the aqueous solution A may comprise, as salt, only a lead salt, for example lead(II) nitrate.

Whatever the case, the aqueous solution A advantageously has a molar content of salt(s) of between 0.1 mol/L and 0.6 mol/L, on the understanding that:

for a precursor of formula (3), this content will preferentially be greater than 0.2 mol/L, while for a precursor of formula (4), this content will preferentially be no more than 0.2 mol/L.

Step b) can be implemented by any device that makes it possible to deliver the mixture M in a divided form and, in particular in the form of drops, in the aqueous solution A such as a syringe provided with a needle or a conduit that comprises a needle at one of the ends thereof and the other end of which is connected to a pump, for example peristaltic.

In accordance with the invention, the preparation method advantageously also comprises, between step b) and step c), a replacement of all or part of the water of the hydrogel with an organic solvent having a standard boiling point (i.e. a boiling point at a pressure of one atmosphere) below the standard boiling point of water or, in other words, less than 100° C., with a view to facilitating the drying of the beads at step c).

The organic solvent is for example an alcohol such as methanol or ethanol, preference being given to ethanol.

As for the replacement of all or part of the water of the hydrogel with an organic solvent, this may be implemented by draining the beads obtained at step b), rinsing them with water and then immersing them in a succession of baths comprising either solely the organic solvent or a water/organic solvent mixture with an increasing concentration by volume of organic solvent.

The drying of the beads obtained at step b) or after replacement of all or part of the water of the hydrogel with an organic solvent is for example implemented by placing these beads in an oven set to the temperature of 60° C., for several hours.

As for the calcination of the beads thus dried, this is advantageously implemented at a temperature ranging from 200° C. to 600° C. and, better still, from 350° C. to 550° C., for example for 1 to 24 hours, on the understanding that:

for a precursor of formula (3), the calcination temperature is preferably above 400° C., while for a precursor of formula (4), the calcination temperature is preferably no more than 400° C.

If an addition of a lead salt is implemented in the pores of the particles obtained at step d), then this addition is preferably implemented by immersing the particles in an aqueous solution comprising this lead salt, for example to the extent of 0.005 mol/L to 1.6 mol/L, then drying the particles, for example in an oven set to a temperature of between 60° C. and 110° C., for several hours, for example 24 hours. In which case the lead salt is a water-soluble salt of the lead (II) nitrate, lead(II) chlorate or lead(II) perchlorate trihydrate type.

In a variant, however, the depositing of a lead salt in the pores of the particles obtained at step d) can also be implemented by other methods such as, for example, a chemical vapour deposition (or CVD) of a lead salt that is insoluble or only slightly soluble in water, of the lead(II) sulfide type, in accordance with a protocol such as the one described by R. Yousefi et al. in *Current Applied Physics* 2014, 14(8), 1031-1035, hereinafter reference [3].

In this way a material is obtained that has a capacity for capturing gaseous iodine that varies between 40 mg and 200 mg per g of material, i.e. a capacity that lies in the top of the range of capture capacities exhibited by the solid adsorbents that are currently used for capturing iodine present in gaseous effluents in the factories processing spent nuclear fuels.

Thus the object of the invention is the use of a material as defined above for capturing the iodine present in a gaseous effluent by putting this material in contact with the gaseous effluent.

Another object of the invention is a method for processing a gaseous effluent comprising iodine, which comprises the steps of:

capturing the iodine by putting the gaseous effluent in contact with a material as defined previously, by means of which a material comprising lead iodide is obtained; then ii) heat treatment (or reactive sintering) of the material comprising the lead iodide, by means of which the material is transformed into an iodoapatite by a chemical change that can be described for the following reaction:

$$3Pb_{3-x}X_x(VO_4)_{2-2y}(PO_4)_{2y} + PbI_2 \rightarrow Pb_{10-3x}X_{3x}(VO_4)_{6-6y}(PO_4)_{6y}I_2,$$

X, x and y having the same meanings as before.

In accordance with the invention, the heat treatment preferably comprises a heating of the material at a temperature ranging from 400° C. to 650° C., for example for 30 minutes to 2 hours. This heating may be assisted or not by an external pressure.

This heat treatment is preferably implemented by flash sintering (or SPS, standing for "Spark Plasma Sintering"), for example at a temperature of 400° C. for 30 minutes, with a temperature rise ramp of for example 50° C./min and under a uniaxial pressure, for example of 40 MPa.

Finally, the object of the invention is a method for conditioning the iodine present in a gaseous effluent, which comprises the implementation of the method for processing a gaseous effluent comprising iodine as previously defined.

In accordance with the invention, the iodine present in the gaseous effluent is preferably radioactive iodine and in particular iodine-129.

Other features and advantages of the invention will emerge from the reading of the additional description that follows and which refers to the accompanying figures.

It goes without saying that this additional description is given only by way of illustration of the object of the invention and under no circumstances constitutes a limitation of this object.

EXAMPLE OF AN EMBODIMENT OF THE INVENTION

I—Preparation of a Material of the Invention:

A material of the invention, consisting of porous particles of lead vanadate, $Pb_3(VO_4)_2$, the pores of which comprise lead(II) nitrate, $Pb(NO_3)_2$, is prepared in accordance with the following operating protocol:

an aqueous solution of sodium alginate (Sigma-Aldrich) is added, under magnetic stirring, to an aqueous suspension of lead pyrovanadate, $Pb_2V_2O_7$, to obtain an aqueous mixture comprising 2% by mass sodium alginate and 3% by mass $Pb_2V_2O_7$ (i.e. 2 g of sodium alginate and 3 g of $Pb_2V_2O_7$ for 100 g of water), which is maintained under weak magnetic stirring for 4 hours;

2) the mixture obtained at step a) is extruded in the form of drops in an aqueous solution comprising 0.27 mol/L of lead(II) nitrate; this extrusion consists in circulating the mixture in a pipe that comprises a needle at one of the ends thereof and the other end of which is connected to a peristaltic pump, and causing the mixture obtained at step a) to fall drop by drop, via the opening in the tip of the needle, in an aqueous solution of lead(II) nitrate, by means of which gelatinous beads are obtained, with dimensions typically between 0.5 mm and 10 mm; these beads are formed by a mixture of $Pb_2V_2O_7$ and lead alginate, the divalent lead ions having in fact replaced the monovalent sodium ions of the alginate during the extrusion;

3) the gelatinous beads obtained at the end of step 2) are subjected to a water/ethanol exchange, which enables the hydrogel that constitutes them to be transformed into an alcohol gel; to do this, the beads are drained, rinsed with water and placed in immersion in a bath of ethanol for 10 minutes; this immersion is repeated three times;

4) the alcohol gel beads obtained at step 3) are subjected to drying at 60° C. for one night;

5) the dried alcohol-gel beads are subjected to a calcination at 500° C. for 1 hour and 30 minutes under air (with a temperature rise ramp of 5° C./min); then 6) the particles obtained at step 5) are immersed in an aqueous solution comprising 0.1 mol/L of lead(II) nitrate for one hour, and they are then dried at 90° C. for 24 hours.

In the course of step 5), the alginate present in the alcohol-gel beads is decomposed and these beads are transformed into particles, with dimensions typically between 300 μm and 3 mm, and which comprise an inorganic skeleton composed of lead vanadate. The initial presence of organic matter, represented by the alginate, in the beads makes it possible to generate porosity. In parallel, $Pb_2V_2O_7$ is converted into $Pb_3(VO_4)_2$ because of its reaction with the lead included in the lead alginate that formed at step 2). This reaction can be written schematically as follows:

$$Pb_2V_2O_7 + PbO \rightarrow Pb_3(VO_4)_2.$$

As for step 6), this makes it possible to fill the pores of the particles of lead(II) nitrate able to form lead iodide, $PbI_2$, by reaction with the gaseous iodine.

Figure 1:
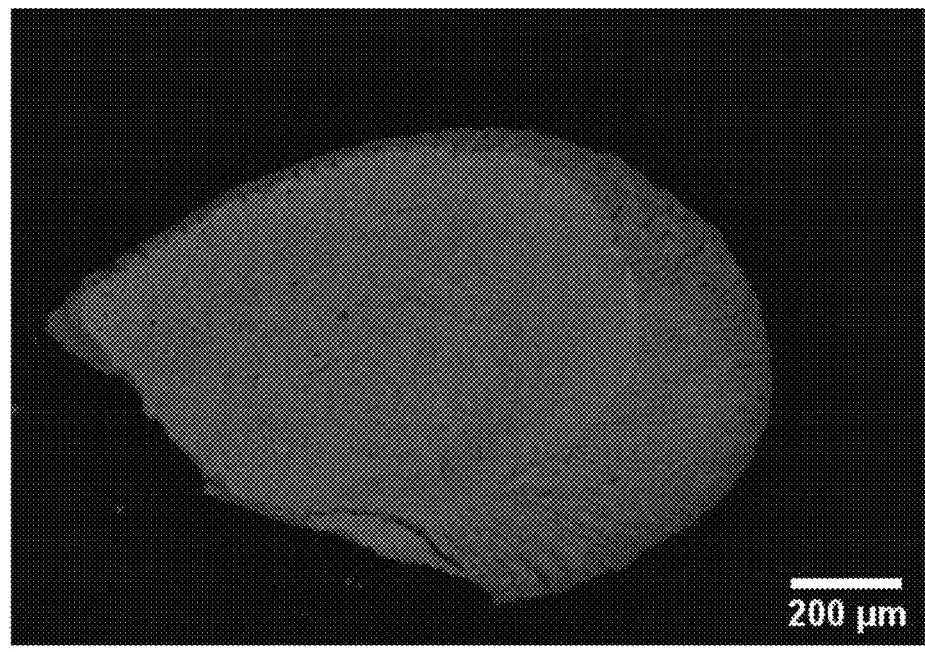
FIG. 1 is an image taken by scanning electron microscopy (or SEM), in backscattered electron mode and at a magnification of ×70, of a particle of a material of the invention before filling the pores of this particle with a lead salt.
Figure 2:
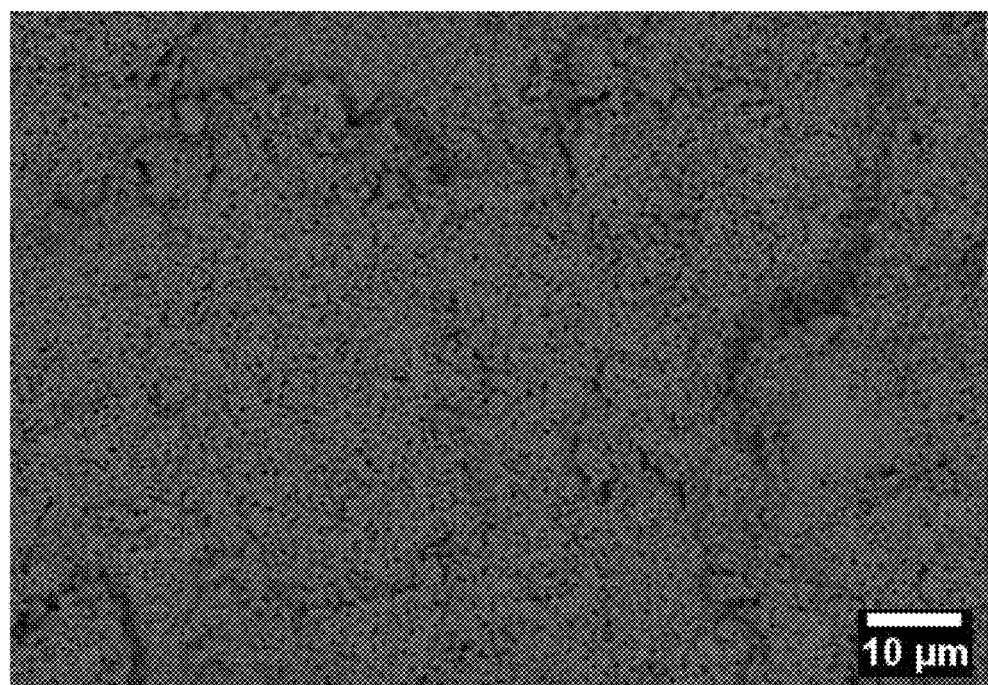
FIG. 2 is an image similar to the one in FIG. 1 but taken at a magnification of ×1 100.

FIGS. 1 and 2 correspond to images taken under SEM, in backscattered electron mode, of a particle of the material as obtained at step 5 above. FIG. 1 corresponds to a magnification of ×70 while FIG. 2 corresponds to a magnification of ×1 100.

FIG. 1 shows an overall view of the particle while FIG. 2 shows the porous nature of this particle, the porosity corresponding to the small black dots of pseudospherical shape.

II—Exposure of the Material of the Invention to Gaseous Iodine:

The material as obtained at point I above is exposed to vapours of diiodine $I_2$, at 60° C. for 16 hours.

Figure 3:
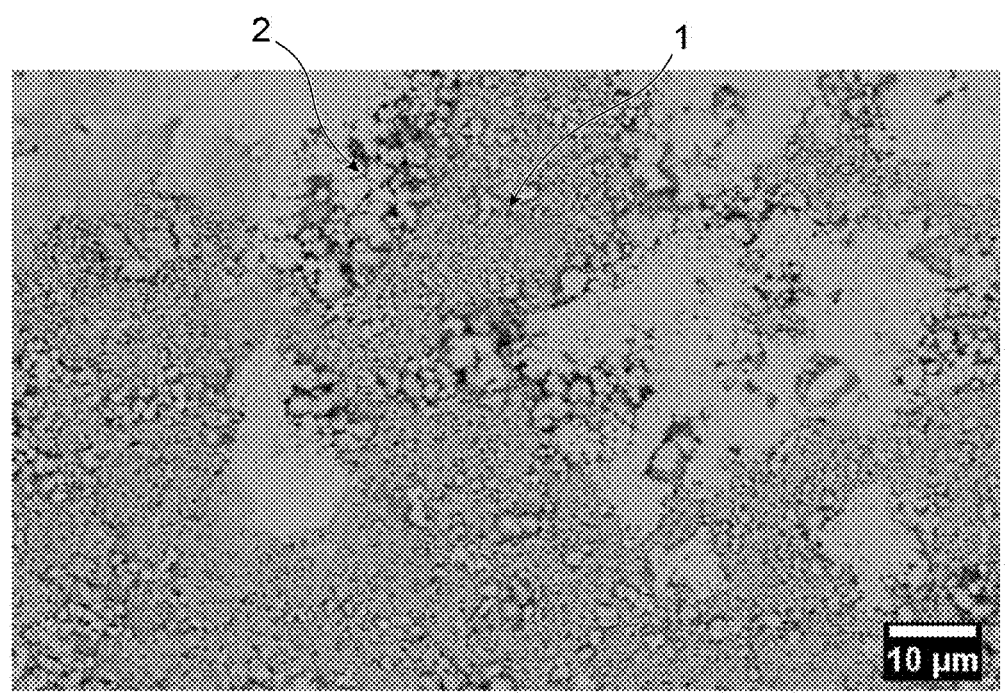
FIG. 3 illustrates the microstructure, obtained by SEM, at a magnification of ×1 000, of a particle of a material of the invention after exposing this material to diiodine vapours.
Figure 4:
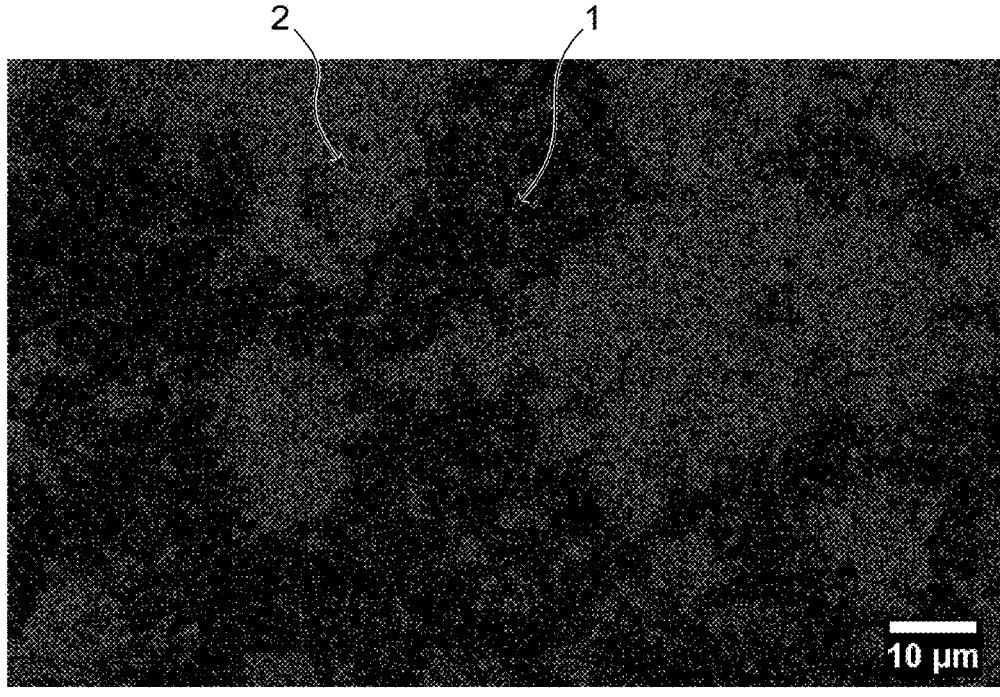
FIG. 4 illustrates the elementary mapping of iodine, as obtained by energy-dispersive X-ray spectroscopy (or EDS) at a magnification of ×1 000, for a particle of a material of the invention after exposing this material to diiodine vapours.

FIGS. 3 and 4 illustrate, in the first case, the microstructure of a particle of the material as observed at the end of this exposure by SEM, and, in the second case, the mapping X of the iodine as observed for this particle by EDS. FIGS. 3 and 4 correspond to a magnification of ×1 000.

On FIGS. 3 and 4, the darkest zones in grey level, one of which is shown by the arrow numbered 1, correspond to zones rich in lead iodide, $PbI_2$, while the lightest zones in grey level, one of which is shown by the arrow numbered 2, correspond to zones rich in lead vanadate, $Pb_3(VO_4)_2$.

III—Consolidation of the Material of the Invention in an Iodoapatite:

The material loaded with iodine, as obtained at point II above, is subjected to heat treatment corresponding to a reactive sintering by SPS at 400° C. for 30 minutes, with a temperature rise ramp of 50° C./min and under uniaxial pressure of 40 MPa.

REFERENCES CITED

[1] WO-A-96/18196
[2] WO-A-2009/047246

8

[3] R. Yousefi et al., *Current Applied Physics* 2014, 14(8), 1031-1035

What is claimed is:

1. An inorganic material in a form of open-porosity particles, wherein each of the particles comprises:

a lead vanadate or phosphovanadate of formula (1):

$$Pb_{3-x}X_x(VO_4)_{2-2y}(PO_4)_{2y} \quad (1)$$

where:

x is equal to 0 or x is greater than 0 but no more than 0.33;

y is equal to 0 or y is greater than 0 but less than 1;

X is $Ba^{2+}$, $Ca^{2+}$, $Sr^{2+}$ or $Cd^{2+}$; and metallic lead or a lead salt, wherein the lead salt is selected from the group consisting of: lead(II) sulfide, lead(II) sulfate, lead(II) carbonate, lead(II) bromide, lead(II) chloride, lead(II) fluoride, lead(II) hydroxide, lead(II) selenide, lead(II) telluride, lead(II) nitrate, lead (II) chlorate and lead(II) perchlorate trihydrate.

2. The material of claim 1, wherein the metallic lead or the lead salt is intimately mixed with the lead vanadate or phosphovanadate.

3. The material of claim 2, wherein the lead salt is lead(II) sulfide.

4. The material of claim 1, wherein the lead salt is within the pores of the particles.

5. The material of claim 4, wherein the lead salt is lead(II) nitrate.

6. The material of claim 1, wherein the lead vanadate or phosphovanadate is of formula (2):

$$Pb_3(VO_4)_{2-2y}(PO_4)_{2y} \quad (2)$$

wherein y is equal to 0 or y is greater than 0 but less than 1.

7. The material of claim 6, wherein the particles comprise lead vanadate of formula $Pb_3(VO_4)_2$.

8. The material of claim 1, wherein the particles have dimensions between 300 μm and 3 mm.

9. A method for preparing the material of claim 1, comprising at least the steps of:

a) preparing a mixture M comprising at least one precursor of formula (3) or of formula (4):

$$Pb_{2-x}X_xV_{2-2y}P_{2y}O_7 \quad (3)$$

$$Pb_{3-x}X_x(VO_4)_{2-2y}(PO_4)_{2y} \quad (4)$$

where:

x is equal to 0 or x is greater than 0 but no more than 0.33;

y is equal to 0 or y is greater than 0 but less than 1;

X is $Ba^{2+}$, $Ca^{2+}$, $Sr^{2+}$ or $Cd^{2+}$; and an alginate of an alkaline metal in water;

b) extruding in a divided form the mixture M in an aqueous solution A comprising a lead salt and optionally a barium salt, a calcium salt, a strontium salt or a cadmium salt, whereby beads formed by a hydrogel are obtained;

c) drying the beads; and d) calcining the beads, whereby open-porosity particles are obtained;

and further comprising:

adding metallic lead or a lead salt that is insoluble or only slightly soluble in water to the precursor of formula (3) or (4) and to the alkaline metal alginate in the mixture M; or depositing a lead salt in the pores of the particles obtained at step d).

10. The method of claim 9, which further comprises, between step b) and step c), a replacement of all or part of the water of the hydrogel by an organic solvent having a standard boiling point of less than 100° C.

11. A method for capturing iodine present in a gaseous effluent, comprising putting the gaseous effluent in contact with the material of claim 1.

12. The method of claim 11, wherein the iodine present in the gaseous effluent is a radioactive iodine.

13. The method of claim 12, wherein the radioactive iodine is iodine-129.

14. A method for conditioning iodine present in a gaseous effluent in a form of an iodoapatite, comprising the steps of:

i) capturing the iodine by putting the gaseous effluent in contact with the material of claim 1 whereby a material comprising lead iodide is obtained; then ii) heat treating the material comprising lead iodide, whereby the material comprising lead iodide is transformed into the iodoapatite.

15. The method of claim 14, wherein at step ii), the material comprising lead iodide is heated at a temperature from 400° C. to 650° C.

16. The method of claim 14, wherein the iodine present in the gaseous effluent is a radioactive iodine.

17. The method of claim 16, wherein the radioactive iodine is iodine-129.

* * * * *